Dec. 18, 1923.  1,477,793
C. A. WATROUS
LIQUID FUEL BURNER FOR HEATERS
Filed April 17, 1922   8 Sheets-Sheet 1

Fig.1

Inventor
Charles A. Watrous
by Onwig & Hague
Attys.

Dec. 18, 1923.

C. A. WATROUS 1,477,793

LIQUID FUEL BURNER FOR HEATERS

Filed April 17, 1922    8 Sheets-Sheet 2

Inventor.
Charles A. Watrous.
by Orwig & Hague Attys

Dec. 18, 1923.

C. A. WATROUS

LIQUID FUEL BURNER FOR HEATERS

Filed April 17, 1922

Inventor
Charles A. Watrous
by Orwig & Hague Attys

Dec. 18, 1923.

C. A. WATROUS

1,477,793

LIQUID FUEL BURNER FOR HEATERS

Filed April 17, 1922      8 Sheets-Sheet 5

Patented Dec. 18, 1923.

1,477,793

UNITED STATES PATENT OFFICE.

CHARLES A. WATROUS, OF DES MOINES, IOWA.

LIQUID-FUEL BURNER FOR HEATERS.

Application filed April 17, 1922. Serial No. 553,939.

*To all whom it may concern:*

Be it known that I, CHARLES A. WATROUS, a citizen of the United States, and resident of Des Moines, in the county of Polk and State of Iowa, have invented a certain new and useful Liquid-Fuel Burner for Heaters, of which the following is a specification.

The object of my invention is to provide an oil burning furnace of simple, durable and inexpensive construction in which a maximum of heat may be generated by a minimum amount of fuel oil and which may be applied readily, quickly and easily to a furnace of any ordinary type.

More specifically it is my object to provide a furnace of this class in which a circular or spiral motion is given to the burning liquid fuel and the heated air, which motion is continued until the products of combustion pass into the discharge flue so that these products of combustion have a long path of travel within the furnace enabling them to give off a maximum amount of heat generated by the furnace and in this connection it is my object to securely seal the lower part of the furnace against the admission of any cold air and to supply previously heated air only for combustion purposes within the furnace, and also to provide means in the flue for retarding but not stopping the escape of the products of combustion.

A further object is to provide simple, durable and inexpensive means for controlling the supply of liquid fuel to the furnace, which means may be formed complete or ordinary valves and fittings and may be assembled in an independent frame exterior to the furnace where they can be observed and manipulated without opening the furnace; and, Further in this connection it is my object to provide controlling valves for the liquid fuel which may be readily, easily and accurately adjusted by the operator to suit the requirements of each individual furnace, and also to provide automatic means controlled by the temperature of the area heated by the furnace for regulating and controlling the supply of liquid fuel.

A further object is to provide an improved burner or combustion bowl into which the liquid is fed and which is so constructed and arranged that the flow of liquid fuel can not become easily clogged, and the liquid fuel will be given a wide and uniform distribution and the products of combustion will be given a rotary or spiral motion.

A further object is to provide a device of this class in which the flame will not be extinguished or blown out when the supply of liquid fuel to the burner is quickly cut off or diminished; and More specifically, in this connection, it is my object to provide a fuel passageway leading to the burner of relatively large capacity and so arranged that the fuel just before being discharged into the bowl will be kept relatively cool, whereby in the event that the furnace has been burning at intense heat or at a maximum capacity and the supply of liquid fuel should be shut off or rapidly diminished, the liquid fuel remaining at the discharge end of the fuel supply pipe can not become rapidly vaporized to such an extent as to extinguish or blow out the flame.

A further object is to provide means of simple and inexpensive construction for providing a maximum amount of previously heated air to which a spiral or whirling motion is imparted and which is delivered to a point directly above the top of the burner or combustion bowl.

A further object is to provide improved means of simple construction for preventing the so-called "roar" of the furnace and at the same time to apply additional air for combustion purposes to the interior of the furnace when the furnace is being operated at its maximum capacity.

My invention consists in the construction, arrangement and combination of the various parts of the device, whereby the objects contemplated are attained, as hereinafter more fully set forth, pointed out in my claims, and illustrated in the accompanying drawings, in which:

Figure 2 shows a top or plan view of the interior of a furnace having my improvement applied thereto, the two air conducting pipes being shown in section.

Figure 3 shows a sectional view on the line

3—3 of Figure 2, the heated air supply pipe being omitted.

Figure 4 shows a detail sectional view on the line 4—4 of Figure 2.

Referring to the accompanying drawings, I have used the reference numeral 30 to indicate generally the furnace to which my device is to be applied. In this connection it is to be understood that my burner device may be applied to any of the ordinary types of furnaces.

Figure 13:
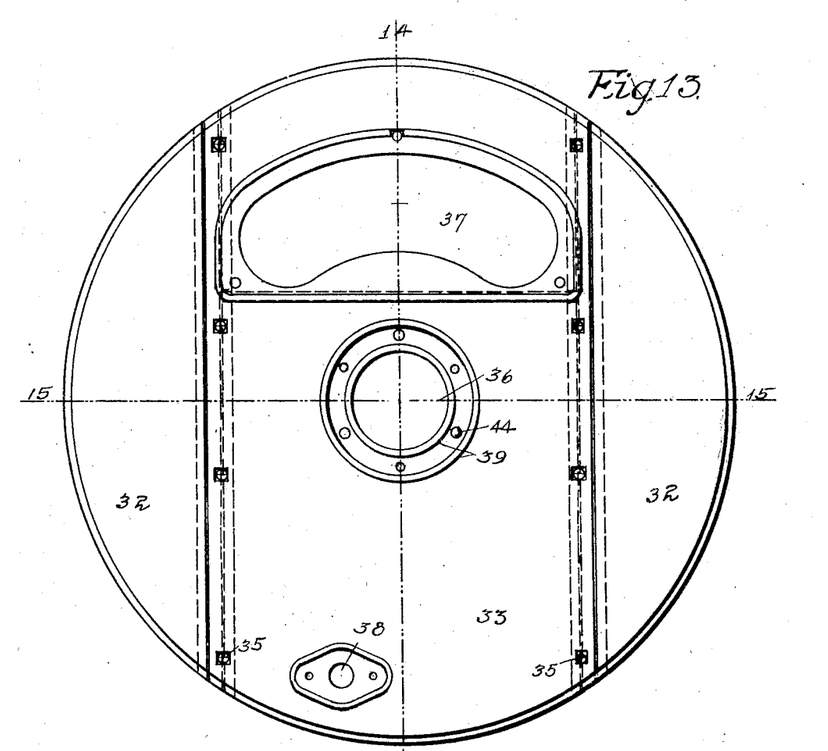
Figure 13 shows a top or plan view of the supporting base designed to be placed on the interior of a furnace upon which the burner device is mounted.
Figure 14:
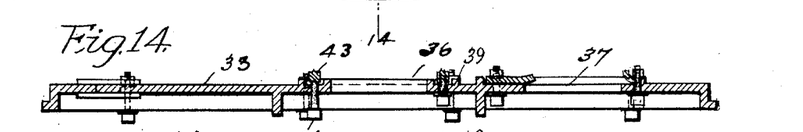
Figure 14 shows a sectional view on the line 14—14 of Figure 13.
Figure 15:
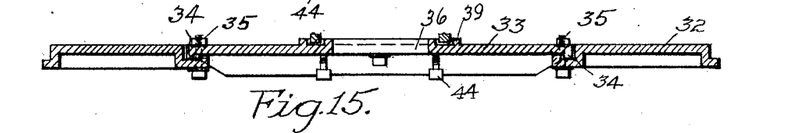
Figure 15 shows a sectional view on the line 15—15 of Figure 13.

The flue pipe leading from the furnace is indicated by the reference numeral 31 and in the present instance a round metal pipe is shown. In applying my device to a furnace, I insert the sectional base at or near the point where the grates of an ordinary coal burning furnace are located. This sectional base when applied to round furnaces has two segmental side plates 31, and a central plate 33, the side plates 32 being provided at their inner edges with grooves opening upwardly into which the downwardly extended edges 34 of the plate 33 are extended. These sectional plates are firmly held together by bolts 35 and form a relatively air tight base. At the center of the central plate 33 is a circular opening 36 through which the fuel supply and overflow pipe, hereinafter described, may be inserted. At the rear of the plate 33 there is an opening 37 for the heated air supply pipe, and at the front of the plate 33 there is an opening at 38 for the anti-vibrating and auxiliary air supply pipe hereinafter described.

Formed on the top of the central portion of the plate 33 around the opening 36 are the upwardly extended concentric ribs 39 forming a groove between them for the purposes hereinafter made clear.

My improved burner or combustion bowl is preferably formed complete of a single piece of cast metal and comprises a bowl-shaped body portion 40 having at its central portion an upwardly extended cone-shaped portion 41. The interior of the combustion bowl from the base of the cone to the periphery of the bowl is of parabolic shape, as shown clearly in Figure 3, and in the interior of the bowl on its upper surface are formed a series of raised ribs 42, which ribs are extended spirally from the bottom of the cone 41 to the periphery of the bowl and the height of each rib gradually increases toward the periphery of the bowl.

Figure 1:
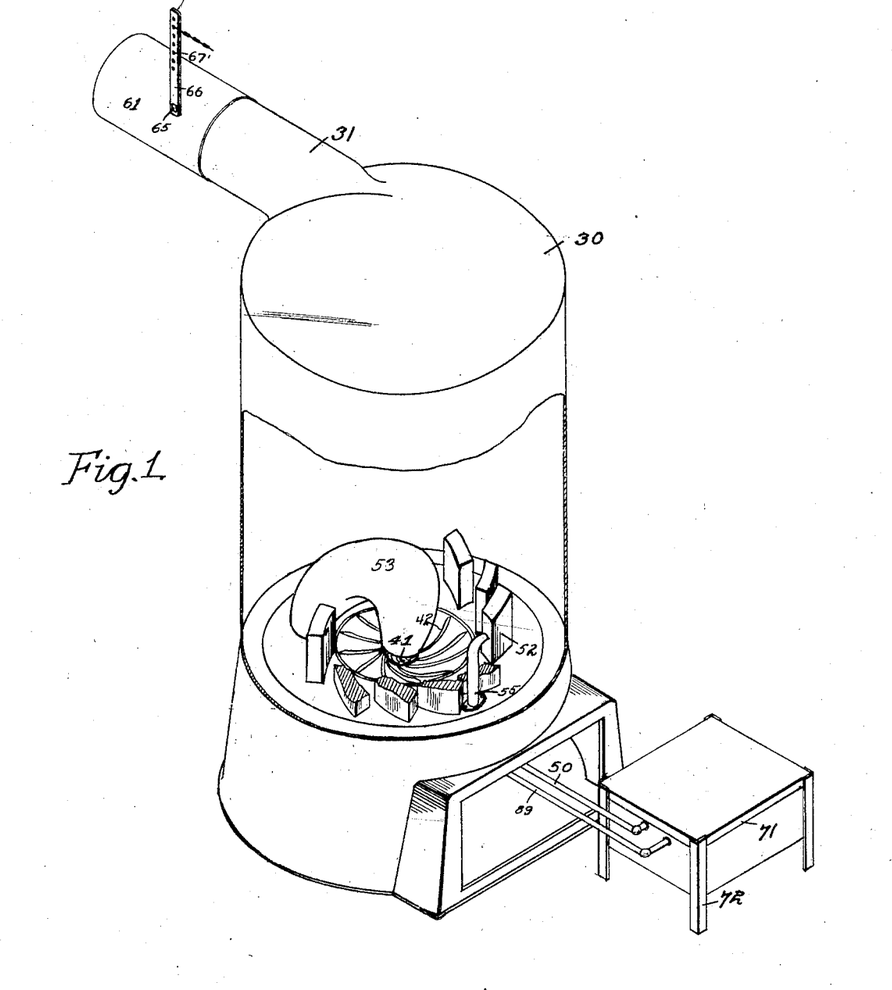
Figure 1 shows an isometric view of a furnace having my improved liquid fuel burner and controlling mechanism applied thereto, parts of the exterior of the furnace being broken away to show the construction of my attachment.
Figures 2, 3, 4:
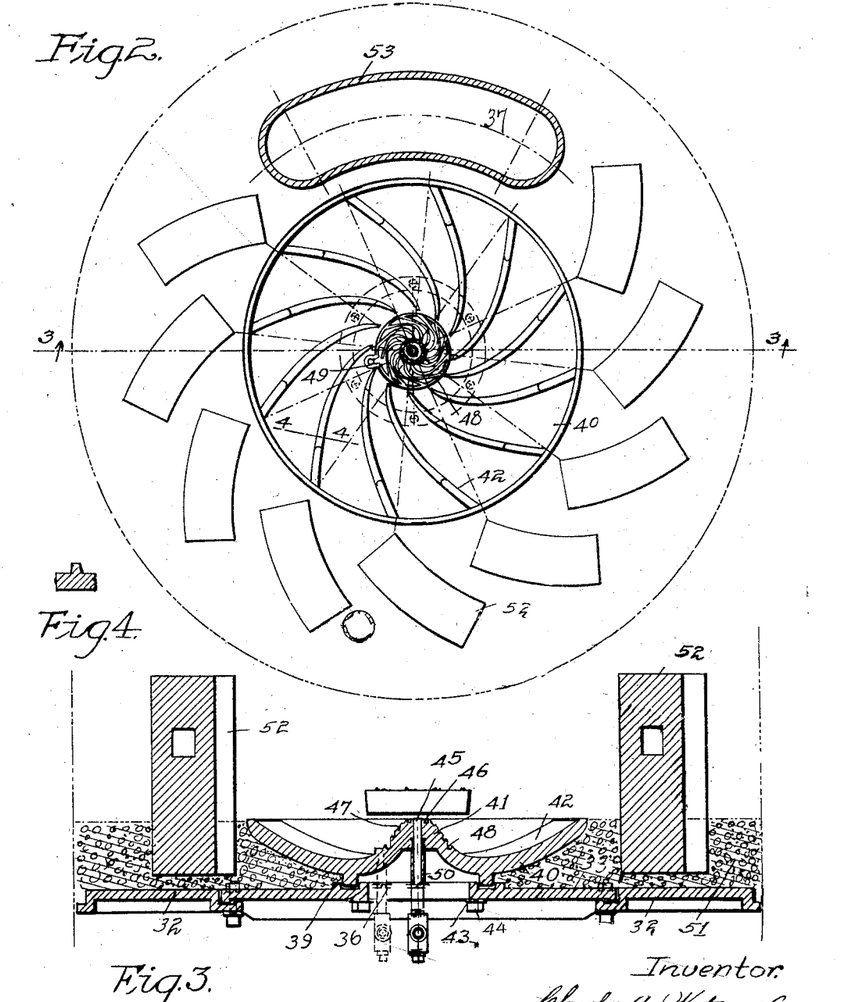

On the bottom of the bowl is an annular downwardly extended rib 43 which is received between the ribs 39 of the base, and extended through the base and in engagement with said rib 43 are several set screws 44 by which the combustion bowl may be accurately leveled. Extended vertically through the cone-shaped central portion of the bowl is a circular passage way 45 for the liquid fuel. This passage way 45 is made of relatively large diameter and the fuel supply pipe leading to it is so positioned in the furnace that cold air drawn from the furnace front below the grate to the air supply pipe 53 will pass close to the fuel supply pipe near its discharge end for the purpose of preventing excessive heating of this discharge end of the fuel supply pipe. As a result of this arrangement, I am able to maintain a flame within the furnace at all times. Heretofore furnaces of this class have usually been provided with a relatively small fuel discharge opening and in such construction it frequently occurs that the flame will be blown out, when after the furnace has been burning at its maximum of capacity, the flow of liquid fuel is quickly diminished, then the remaining small supply of liquid in the discharge end of the fuel supply pipe will be instantly vaporized and will blow out the liquid fuel at the discharge end, thus temporarily extinguishing the flame before the remaining liquid fuel in the supply pipe reaches the discharge end where it may be burned.

However, by my improved construction this can not occur because the area of the fuel supply pipe at its discharge end is such that under such conditions as before stated only a part of the liquid fuel in the discharge end will vaporize and there will always be a sufficient supply of fuel at the discharge end to maintain a blaze and to prevent the flame from being blown out. In addition to this, it is advantageous to keep the fuel supply pipe leading to the discharge end relatively cool to prevent its rapid vaporization of the liquid fuel until it reaches the discharge end and commences to flow out over the cone-shaped central portion of the combustion bowl.

Formed in the top of the cone adjacent to this opening is a circular groove 46. Communicating with this groove and extended spirally downwardly and outwardly along the upper surface of the cone is a series of grooves 47, and these grooves terminate in a lower circular groove 48 into which they discharge.

Communicating with the combustion bowl is a passageway 49 extending downwardly through the bowl and designed to communicate with an overflow pipe hereinafter described. A fuel supply pipe 50 is received into the lower end of the passageway 45.

After the base and the combustion bowl have been placed in position, then I preferably fill the space on top of the base up to a point approximately level with the top of the bowl with a substance 51 made of a heat resisting and radiating cement and gravel or the like and in this cement material I have placed a series of heat radiating devices 52 which may be made of fire brick or the like and which stand in upright position spaced apart from each other, the inner and outer faces thereof are preferably curved, as shown in Figure 2, and the inner faces are preferably arranged substantially in line with the outer ends of the rib 42 of the combustion bowl so that the products of combustion passing from the combustion bowl with a spiral motion will engage the inner surfaces of these radiating reflectors 52, and this motion will be continued by the radiating deflectors on account of their shape and positions, and they will also absorb and radiate heat.

Figure 5:
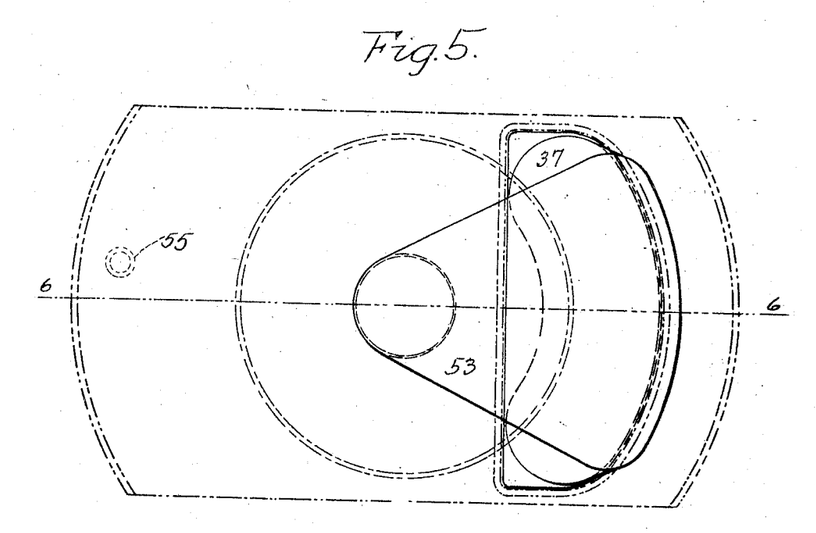
Figure 5 shows a top or plan view of a heated air supply pipe, the positions of the burner or combustion bowl and the furnace walls with relation thereto being shown by dotted lines.

For supplying air for combustion purposes, and for preheating it I have provided a heated air supply pipe preferably made of cast metal and indicated generally by the reference numeral 53. Its lower end which rests on top of the base surrounding the opening 37, is oval, as shown in Figure 2, and its body portion extends first rearwardly and upwardly and then forwardly and upwardly and then straight downwardly over the center of the combustion bowl, and the sides of the body portion taper from a maximum width at the bottom inwardly to the rounded discharge opening at the center, as shown in Figure 5.

Figure 6:
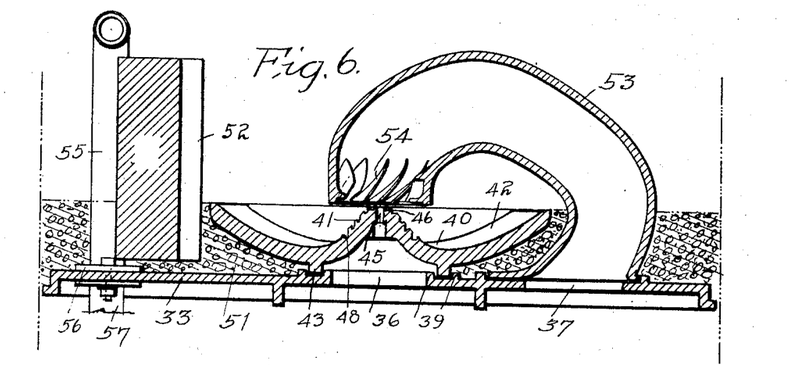
Figure 6 shows a vertical sectional view on the line 6—6 of Figure 5. In this figure the combustion bowl and the adjacent parts are also illustrated.
Figures 7, 8, 9, 10:
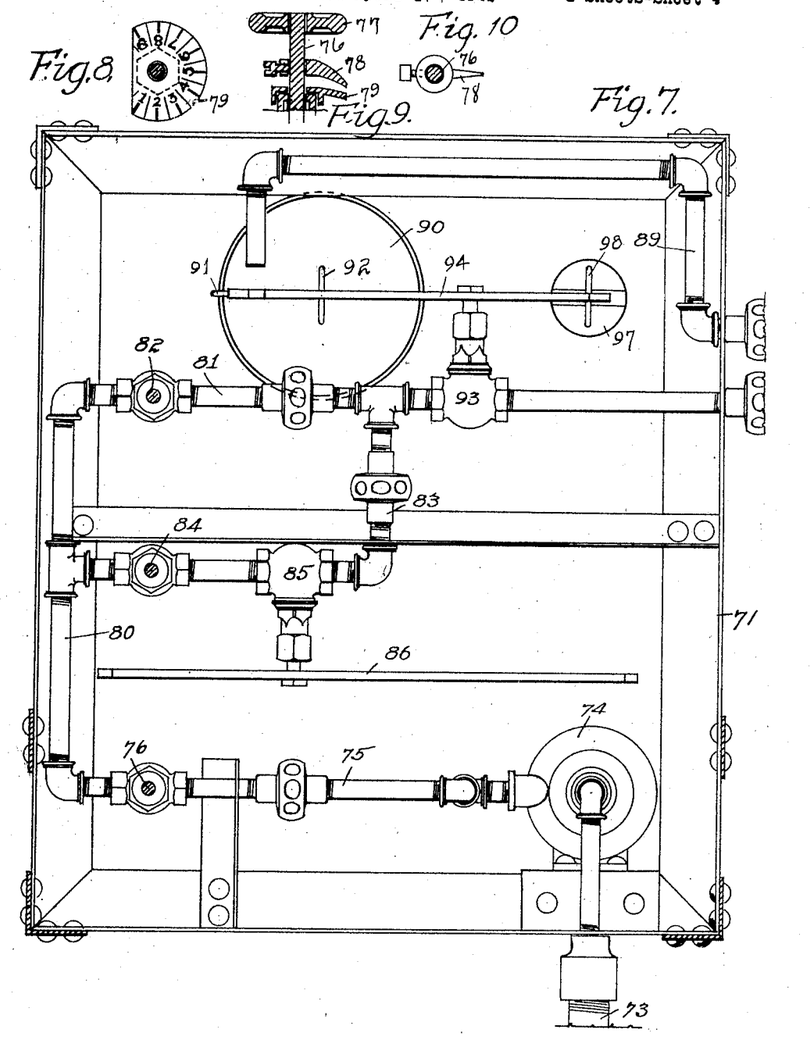
Figure 7 shows a top or plan view of the fuel oil controlling mechanism and its surporting frame.
Figure 8 shows a detail plan view of one of the indicators for the needle valve.
Figure 9 shows a vertical sectional view of the top portion of one of the needle valves and the indicator attached thereto.
Figure 10 shows a top or plan view of the indicator for the needle valve.

The walls of the interior of this heated air supply pipe are formed and shaped so as to offer a minimum resistance to the passage of air and for this purpose I have formed them in the shape of a series of parabolic curves, as clearly shown in Figure 6. On the interior of the discharge end of the heated air supply pipe I have provided a series of deflectors 54 which are arranged spirally and tend to give to the current of air passing through the pipe a spiral motion directly above the central portion of the combustion bowl.

In order to prevent the furnace from "roaring" when a relatively large quantity of fuel oil is being burned, I have provided a device comprising a pipe 55 having a base 56 mounted on top of the base 33 surrounding the opening 38. This pipe extends upwardly and its upper end inclines horizontally toward the discharge end and in the same general direction as the path of travel of the products of combustion around the interior of the furnace but not parallel with this path of travel.

Figures 16, 17, 18, 19, 20:
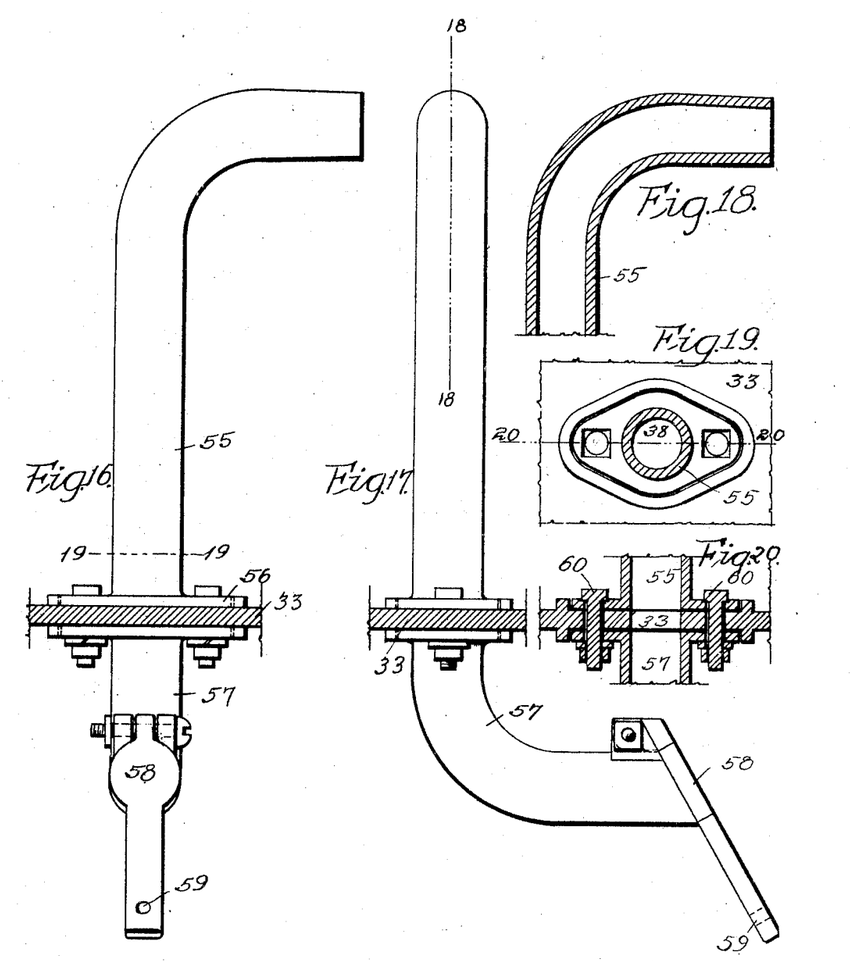
Figure 16 shows a vertical sectional view of a part of the supporting base, and illustrating the anti-vibrating and auxiliary air supply pipe.
Figure 17 shows a similar view taken at right angles to Figure 16.
Figure 18 shows a sectional view on the line 18—18 of Figure 17.
Figure 19 shows a sectional view on the line 19—19 of Figure 16.
Figure 20 shows a sectional view on the line 20—20 of Figure 19.
Figure 21:
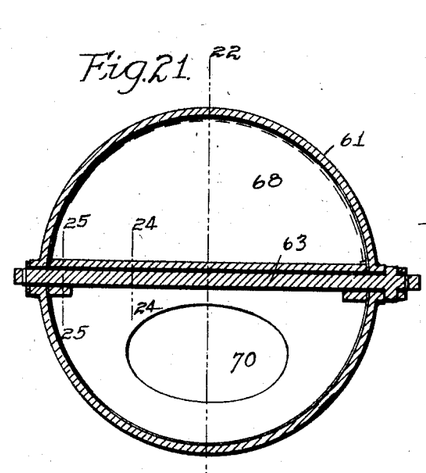
Figure 21 shows a vertical sectional view through a part of the furnace flue pipe illustrating my improved damper device.
Figure 22:
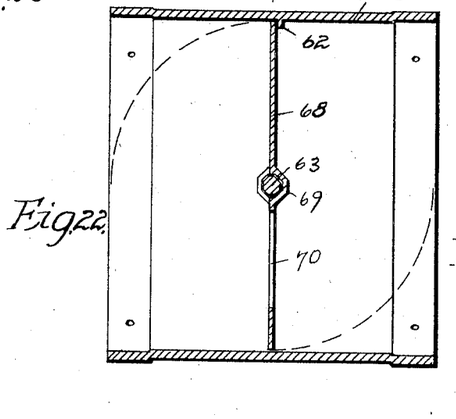
Figure 22 shows a sectional view on the line 22—22 of Figure 21.
Figure 23:
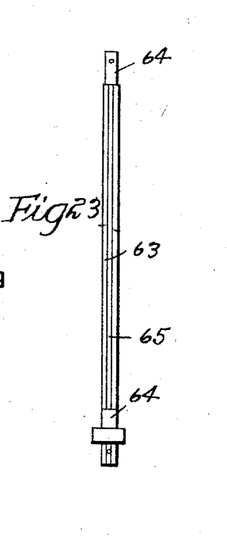
Figure 23 shows a detail view of the damper shaft.
Figure 24:
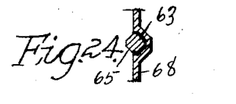
Figure 24 shows a sectional view on the line 24—24 of Figure 21.
Figure 25:
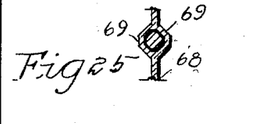
Figure 25 shows a sectional view on the line 25—25 of Figure 21.
Figure 26:
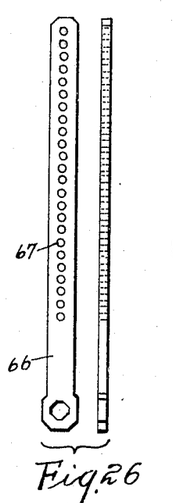
Figure 26 shows a side elevation of the lever attached to the damper shaft.

On the under surface of the base 33 below the opening 38 there is another pipe section 57 having its lower or intake end extended downwardly and outwardly, as shown in Figure 17, and pivoted above this opening is a valve 58, the lower end of which extends downwardly and is provided with an opening 59 to receive a wire or cable for operating the valve. The two pipe sections are connected with each other by the bolts 60.

In the operation of this part of the device, and assuming that the flow of air into the furnace and the rapid combustion of the fuel oil causes such vibrations of the air within the furnace as to result in the creation of a roaring sound, then when the valve 58 is opened another current of air will be drawn into the open end of the pipe and discharge into the interior of the furnace in the same general direction as the air within the furnace is traveling but along somewhat divergent lines, and this auxiliary current of air will create waves or vibrations of different lengths from those produced by the combustion with the result that the air vibrations will be reduced and minimized to such an extent as to prevent the audible roaring sound. In addition to this, it is desirable to provide an additional amount of air when the combustion is taking place rapidly within the furnace.

Mounted in the flue 31 leading from the furnace is a pipe section 61 having formed at its top on the interior a rib 62. Extending horizontally through the pipe section 61 is a damper shaft 63 having two rounded bearings 64 at its ends, which are rotatably mounted in suitable openings therefor in the pipe 61. The central portion of the shaft between the bearings 64 is formed angular, preferably of octagonal form at 65, and on the outer end of the shaft is fixed an arm 66 having a series of opening 67 therein. The damper proper is indicated by the numeral 68 and is provided with angular or octagonal loops 69 at its sides which are fitted to the octagonal portion of the shaft 65. In the lower portion of the damper there is formed an oval draft opening 70. Means are provided as will hereinafter appear for operating this damper, but when, however, the damper is in its normal position it will retard the passage of the products of combustion to the flue but will not prevent such passage because the heated products of combustion will travel toward the flue through the top of the flue and when they strike the damper they will be deflected downwardly and retarded but may then pass through the opening 70. This, of course, is true only when the damper is closed. When there is need for a larger passageway through the flue, then the damper is opened.

Figure 12:
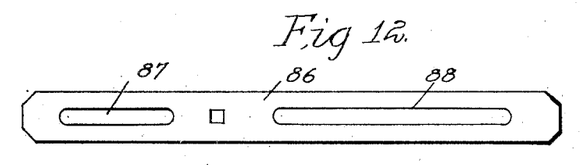
Figure 12 shows a detail side view of the lever for controlling the auxiliary fuel oil controlling valve.

My improved means for controlling the flow of liquid fuel to the furnace comprises the following: The reference numeral 71 indicates a rectangular structural metal frame having supporting legs 72 and designed to rest upon the floor adjacent to the furnace. Supported by this frame is the main supply pipe 73 for the liquid fuel. This pipe discharges into a filter device 74 of ordinary construction and leading from the filter is the pipe 75, in which there is mounted a master needle valve 76. This needle valve is of the ordinary construction and is preferably provided in the upper end of its valve stem with a hand wheel 77 and an indicator 78, and fixed to the top of the valve adjacent to the indicator is the indicator plate 79 suitably marked whereby the hand wheel may be so adjusted as to permit any pre-determined amount of liquid fuel to pass through the valve. Leading from the valve 76 is a pipe 80 which communicates with a normal supply pipe 81, and this pipe 81 communicates with the pipe 50, shown in Figure 3, leading to the combustion bowl. Mounted in the pipe 81 is a normal supply needle valve 82 which is preferably provided with an indicator device of the kind illustrated in Figures 8, 9 and 10 and before described. Communicating between the pipes 80 and 81 on opposite sides of the normal supply valve 82 is an auxiliary supply pipe 83, and in this pipe 83 is an auxiliary supply needle valve 84 which is also preferably provided with an indicating device of the kind illustrated in Figures 8, 9 and 10. In this pipe 83 also there is a cut-off valve 85 of ordinary construction, having attached to its valve stem a lever 86, which lever is illustrated in Figure 12, and is provided with slots 87 and 88 at its ends designed to adjustably receive the auxiliary chains of an automatic controlling device which is not herein illustrated and forms no part of my present invention.

Figure 11:
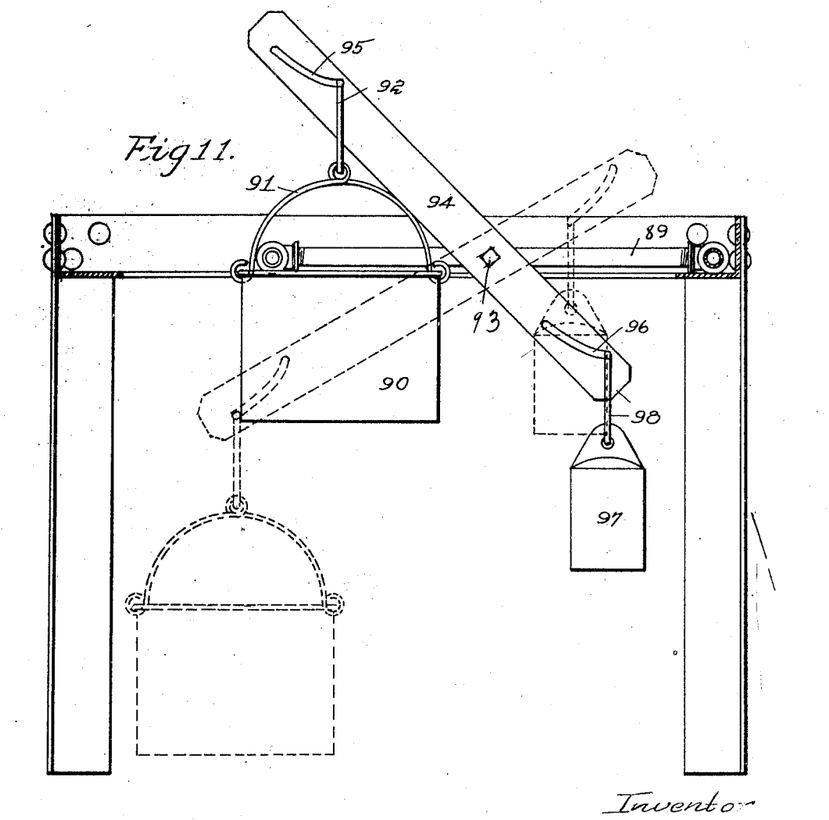
Figure 11 shows a vertical sectional view of part of the frame in which the fuel oil controlling mechanism is supported and the means for automatically shutting off the supply of liquid fuel to the furnace in the event that the furnace is not burning. The dotted lines in this figure show the adjusted positions of the valve controlling means when the valve has been shut.

Leading from the furnace and in communication with the overflow opening 49, shown in Figure 2, is an overflow pipe 89 supported in the frame 71 and discharging into a bucket 90. This bucket, as clearly illustrated in Figure 11, is provided with a bail 91 and a supporting rod 92 attached to the bail. Mounted in the normal supply pipe between the normal supply valve 82 and the furnace is a cut-off valve 93 having connected to its valve stem a lever 94. This lever is provided at its long end with a curved slot 95 and at its short end with a curved slot 96. The supporting rod 92 is slidingly mounted in the curved slot 95 and a weight 97 is provided with a supporting rod 98 which is slidingly mounted in the curved slot 96. The construction and arrangement of these parts is such that when the lever 94 is in the position shown by solid lines in Figure 11, the valve 93 is open.

In the event, however, that the liquid fuel should flow into the combustion chamber and not be consumed, then the overflow therefrom will pass through the pipe 89 into the bucket 90 and when a sufficient amount of the fuel oil is thus received into the bucket 90 to counterbalance the weight 97 then the bucket will slowly descend a short distance and the weight 97 will be correspondingly elevated until such time as the curved slot 95 at the long end of the lever 94 passes a given point, whereupon the bucket will rapidly slide in the slot 94 to the outer end of the long arm of the lever 94 and at the same time the weight 97 will slide toward the center of the lever 94. This will rapidly and forcibly disturb the balance of the lever 94 and forcibly and rapidly close the valve 93, thus preventing further passage of fuel oil to the furnace.

In practical operation it is obvious that my device may be readily, quickly and easily applied to furnaces of any ordinary class because it is only necessary to place within the furnace the base, and on top of the base apply the cement and gravel mixture to make the base air tight and insert the combustion bowl and heat retaining and radiating fire bricks. All of the operative parts for controlling the flow of liquid fuel are contained on the structural frame exterior to the furnace. All of these controlling devices for the liquid fuel are made of ordinary pipes, valves and fittings and may be assembled upon the structural frame in the factory where the device is built so that when the device is applied to a furnace it is only necessary to connect to the furnace the single liquid fuel supply pipe and the single liquid fuel overflow pipe.

When the furnace is in operation and under normal conditions, the capacity of the normal supply valve 82 controls the amount of liquid fuel being fed to the furnace, and this valve is preferably set so that it supplies sufficient fuel to the furnace to meet the minimum normal requirements of the furnace. The pipe leading to the interior of the combustion bowl is relatively large and hence not at all likely to be obstructed by anything entering it from within the furnace, and all of the fuel leading to the controlling needle valves has been previously filtered so that they are not likely to be clogged up.

In the event that a greater amount of heat than normal is desired, then the auxiliary supply valve 85 is opened. This valve 85 is preferably controlled by an ordinary temperature regulator which may be of the kind now in ordinary use and which forms no part of my present invention. When this valve is opened then there is delivered to the furnace the maximum supply of fuel oil suited to the requirements of the furnace and regulated and controlled by the master needle valve 76.

In the event that the fire should become extinguished for any reason, then the overflow pipe will discharge the excessive liquid fuel into the bucket 90 which will automatically close the supply of liquid fuel.

Assuming that the furnace is in operation, then the interior of the furnace will be heated to a relatively high degree and burn the fuel with a white or blue-white flame because all of the air supplied to the combustion bowl will pass through the air supply pipe which itself is highly heated, and deliver the air to the combustion bowl at a high temperature, because the bottom of the combustion chamber is made air tight so that no cold air can be admitted into the combustion chamber.

The amount of heat generated within the furnace and made effective for furnace heating purposes will be relatively large to the proportion of the amount of fuel being consumed because both the incoming air and the products of combustion will be given a spiral motion and the movement will be highly accelerated so that the products of combustion will have a relatively long path of travel before reaching the flue and will give off a very large per cent of its heat for furnace heating purposes before entering the flue, and then on account of the construction of the damper in the flue its movement will be further retarded by the damper. This spiral movement of the incoming air and the products of combustion will also serve the additional advantageous function of supplying sufficient amounts of unburned air to the fire with a rapid movement so that the liquid fuel will be efficiently consumed.

The operation of my improved furnace is made efficient both when the furnace is operated at its minimum capacity and when it is operated at its maximum capacity because there are three elements of the furnace intended to be operated by an automatic control device, to wit: the damper, the valve for controlling the auxiliary fuel supply and the valve for controlling the anti-vibrating air supply pipe 55. When the furnace is working under normal conditions all three of these devices are closed. However, when a greater amount of heat is desired then the said three deveices are all opened. When this takes place there is an additional supply of fuel and there of course must be a correspondingly increased supply of air. This additional air is supplied in two ways, first, on account of the increased draft the air flows more rapidly through the main air supply pipe, and in addition thereto, some air may enter the furnace through the anti-vibrating pipe and the damper is open so that the additional products of combustion may more rapidly escape through the flue.

In furnaces of this class when operating at their maximum capacity, it frequently occurs that the combustion of the fuel causes rapid vibrations of the products of combustion resulting in a roaring sound. I have found that by the use of my improved antivibrating pipe I can supply the additional air needed for combustion purposes and at the same time discharge this air into the furnace in such a manner as to break up the vibratory motion of the products of combustion and wholly eliminate the roaring sound, and by means of my improved device I am enabled to do this without retarding the spiral or circular motion of the products of combustion within the furnace.

In practice I have found that on account of the high efficiency of my improved furnace I am enabled to supply a given amount of heat for the requirements of a residence of a given size just as cheaply by the use of fuel oil as by the use of coal at the prevailing prices, and in addition to this the amount of heat can be regulated and controlled far more accurately than is possible with coal burning furnaces.

Furthermore, the device needs practically no attention on the part of the operator and it has been frequently operated for several weeks at a time without any personal attention whatever.

I claim as my invention:

1. In a liquid fuel burning furnace, the combination of a base designed to be supported within a furnace, a combustion bowl mounted upon the base and formed with a substantially cone-shaped upwardly extended projection at its central portion having a passageway for oil extended vertically through it to its top, the sides of the combustion bowl being extended outwardly and then upwardly, and the said cone-shaped projection being provided near its top with a circular horizontally arranged groove, and also being provided near its bottom with a circular horizontally arranged groove and an overflow pipe communicating with the bowl below the latter groove.

2. In a liquid fuel burning furnace, the combination of a base designed to be supported within a furnace, a combustion bowl mounted upon the base and formed with a substantially cone-shaped upwardly extended projection at its central portion having a passageway for oil extended vertically through it to its top, the sides of the combustion bowl being extended outwardly and then upwardly, and the said cone-shaped projection, and a series of spirally arranged grooves formed in the surface of the cone-shaped part extended downwardly and outwardly therefrom.

3. In a liquid fuel burning furnace, the combination of a base designed to be supported within a furnace, a combustion bowl mounted upon the base and formed with a substantially cone-shaped upwardly extended projection at its central portion having a passageway for oil extended vertically through it to its top, the sides of the combustion bowl being extended outwardly and then upwardly, and a series of tangentially arranged ribs on the upper surface of the combustion bowl.

4. In a liquid fuel burning furnace, the combination of a base designed to be supported within a furnace, a combustion bowl mounted upon the base and formed with a substantially cone-shaped upwardly extended projection at its central portion having a passageway for oil extended vertically through it to its top, the sides of the combustion bowl being extended outwardly and then upwardly, a series of tangentially arranged ribs on the upper surface of the combustion bowl, and a series of heat radiating blocks supported on the base around the exterior of the bowl and arranged tangentially relative to the center of the bowl and spaced apart from each other.

5. In a liquid fuel burning furnace, the combination of a base designed to be supported within a furnace, a combustion bowl mounted upon the base and formed with a substantially cone-shaped upwardly extended projection at its central portion having a passageway for oil extended vertically through it to its top, the sides of the combustion bowl being extended outwardly and then upwardly, and the said cone-shaped projection being provided near its top with a circular horizontally arranged groove, a series of spirally arranged grooves formed in the surface of the cone-shaped part extended downwardly and outwardly therefrom, the said combustion bowl being provided with an overflow passageway leading downwardly from the lower circular groove, a series of curved tangentially arranged ribs formed on the upper surface of the combustion bowl and a series of heat radiating blocks supported upon the base around the exterior of the bowl, said blocks being arranged tangentially and having their side surfaces curved and being spaced apart from each other, for the purposes stated.

6. In a liquid fuel burning furnace, the combination of a base designed to be supported within a furnace, a combustion bowl mounted upon the base and formed with a substantially cone-shaped upwardly extended projection at its central portion having a passageway for oil extended vertically through it to its top, the sides of the combustion bowl being extended outwardly and then upwardly, and the said cone-shaped projection being provided near its top with a circular horizontally arranged groove, and also being provided near its bottom with a circular horizontally arranged groove and an overflow pipe communicating with the bowl, and a series of set screws mounted in the base to engage the bowl for leveling it.

7. In a liquid fuel burning furnace, the combination of a base designed to be placed within a furnace and to form an air tight horizontally arranged partition therein, a combustion bowl mounted upon the base and a conductor for supplying air to the combustion bowl, said conductor comprising a hollow structure open at both ends, there being an opening in said partition communicating with the lower end, said conductor being extended first upwardly and then forwardly and then downwardly at its discharge end directly above the combustion bowl.

8. In a liquid fuel burning furnace, the combination of a base designed to be placed within a furnace and to form an air tight horizontally arranged partition therein, a combustion bowl mounted upon the base and a conductor for supplying air to the combustion bowl, said conductor comprising a hollow structure open at both ends, there being an opening in said partition communicating with the lower end, said conductor being extended first upwardly and then forwardly and then downwardly at its discharge end directly above the combustion bowl, and a series of deflector blades in the discharge end of the conductor arranged to give a spiral movement to the air passing through the conductor.

9. In a furnace of the class described, the combination of a combustion bowl, an air conductor for supplying air to the top of the combustion bowl and a series of heat radiating blocks, said air conductor being provided with deflector blades to impart a spiral motion to the air, said bowl being provided with tangentially arranged blades to give a spiral motion to the products of combustion, and the said radiating blocks being provided with tangentially arranged faces to give a spiral outward movement to the products of combustion after they have passed beyond the edges of the combustion bowl, for the purposes stated.

10. In a furnace of the class described, the combination of a combustion bowl, means for supplying air to a point above the combustion bowl, means for imparting a spiral or circular motion to the products of combustion and the air and an anti-vibrating device comprising a hollow body having its inlet end extended to a point exterior to the combustion chamber and having its discharge end extended upward into the combustion chamber and then in a direction slightly divergent from the path of travel of the products of combustion within the combustion chamber.

11. In a furnace of the class described, the combination of a combustion bowl, means for supplying air to a point above the combustion bowl, means for imparting a spiral or circular motion to the products of combustion and the air and an anti-vibrating device comprising a hollow body having its inlet end extended to a point exterior to the combustion chamber and having its discharge end extended upward into the combustion chamber and then in a direction slightly divergent from the path of travel of the products of combustion within the combustion chamber, and a valve for controlling the admission of air into the anti-vibrating device.

12. In a furnace of the class described, the combination of two side base plates designed to be supported on the interior of a furnace, and being provided with grooves at their inner edges, a central base plate having ribs at its edges to enter said grooves, bolts for connecting the base sections together and a cement material over the top of the base for preventing the passage of air through the base.

13. In an oil burning furnace, the combination of a combustion chamber, a burner therein, manually controlled means for permitting a normal supply of liquid fuel to flow to the burner, means for supplying an auxiliary amount of liquid fuel to the burner, and means for automatically controlling the said means for supplying an auxiliary amount of liquid fuel.

14. In a liquid fuel furnace, the combination of a combustion chamber, a burner therein, means for conducting liquid fuel from a source of supply to the burner, a valve therein for regulating the normal flow to the burner, a by-pass communicating with said fuel conducting means on opposite sides of said valve, a valve in the by-pass for controlling the supply of an auxiliary quantity of liquid fuel in the combustion chamber, means for thermostatically controlling the valve in the by-pass.

15. In a device of the class described, a means for supplying liquid fuel to a furnace comprising a pipe communicating with a source of liquid fuel supply, a master needle valve therein, a pipe communicating with the master needle valve and leading to the combustion chamber of a furnace, a normal needle valve therein and a branch pipe communicating with the pipe in which the normal supply needle valve is located, said branch pipe communicating therewith on opposite sides of the normal supply valve, an auxiliary supply needle valve in said branch pipe and a cut-off valve in said branch pipe, for the purposes stated.

16. In a device of the class described, a means for supplying liquid fuel to a furnace, comprising a pipe communicating with a source of liquid fuel supply, a master needle valve therein, a pipe communicating with the master needle valve and leading to the combustion chamber of a furnace, a normal needle valve therein and a branch pipe communicating with the pipe in which the normal supply needle valve is located, said branch pipe communicating therewith on opposite sides of the normal supply valve, an auxiliary supply needle valve in said branch pipe and a cut-off valve in said branch pipe, an overflow pipe leading from the furnace, a trip device including a receptacle to receive the overflow and a cut-off valve in the supply pipe leading to the furnace designed to be operated by said trip device.

17. In a device of the class described, the combination of a metal frame, a means for controlling the supply of liquid fuel to the furnace contained wholly within and supported by said frame and designed to be located exterior to and adjacent to a furnace, said means comprising a main supply pipe for liquid fuel, a master needle valve therein, a normal supply pipe communicating with the main supply pipe and leading to the furnace, a normal supply needle valve therein, a branch pipe communicating at its ends with the normal supply pipe on opposite sides of the normal supply valve, a cut-off valve in the auxiliary supply pipe, a cut-off valve in the pipe leading to the furnace, a return pipe leading from the furnace and means for actuating the cut-off valve in the supply pipe leading to the furnace, said means being designed to be operated by the weight of the fuel discharged from the return pipe.

18. In a device of the class described, a means for positively actuating a liquid fuel supply cut-off valve by the weight of liquid fuel through a return pipe, said means comprising a cut-off valve, a lever fixed to its valve stem and having a slot in each end, a liquid fuel return pipe, a bucket mounted in position to receive the discharge from the liquid fuel return pipe, a hanger for the bucket slidingly mounted in the slot at one end of the lever and a weight slidingly mounted in the slot at the other end of the lever, said bucket being so arranged that when in a normal position the bucket will be at its limit of movement toward the center and the said weight at its limit of movement from the center, and when the bucket has partly moved downwardly by reason of the weight of the material therein both the bucket and the weight will slide in their slots, the bucket in a direction away from the pivoted center of the lever and the weight in a direction toward the pivoted center of the lever, for the purposes stated.

19. In a liquid fuel burner, the combination of a combustion bowl, a liquid fuel supply pipe leading to the combustion bowl, means for controlling the passageway of liquid fuel through the supply pipe, the said combustion bowl being provided with a fuel opening for the supply pipe of such large capacity that if the burner has been intensely heated and the supply of liquid fuel rapidly diminished the quantity of liquid fuel contained within the passageway leading to the combustion bowl will be sufficient to prevent such rapid vaporization as will cause the flame to be extinguished or blown out.

20. In a liquid fuel burner, the combination of a combustion bowl, a liquid fuel supply pipe leading to the combustion bowl, means for controlling the passageway of liquid fuel through the supply pipe, the said combustion bowl being provided with a fuel opening for the supply pipe of such large capacity that if the burner has been intensely heated and the supply of liquid fuel rapidly diminished the quantity of liquid fuel contained within the passageway leading to the combustion bowl will be sufficient to prevent such rapid vaporization as will cause the flame to be extinguished or blown out, and means for maintaining the supply pipe adjacent to the combustion bowl at a relatively low temperature.

21. In a burner of the class described, the combination of a combustion bowl having a substantially cone-shaped projection therein provided with a passageway for liquid fuel, there being at the upper portion of the cone a horizontally arranged circular groove and there being in the sides of the cone a series of distributing grooves extended downwardly and outwardly, the distributing grooves being in communication with the circular groove and the bottoms of the distributing grooves at the points where they enter the circular groove being slightly spaced above the bottom of the circular groove, whereby a relatively even flow of liquid fuel will be directed from the circular groove to each of the distributing grooves.

Des Moines, Iowa, April 6, 1922.

CHARLES A. WATROUS.